United States Patent
Thomas

(10) Patent No.: US 10,706,368 B2
(45) Date of Patent: Jul. 7, 2020

(54) SYSTEMS AND METHODS FOR EFFICIENTLY CLASSIFYING DATA OBJECTS

(71) Applicant: Veritas Technologies LLC, Mountain View, CA (US)

(72) Inventor: Huw Thomas, Berkshire (GB)

(73) Assignee: Veritas Technologies LLC, Santa Clara, CA (US)

(*) Notice: Subject to any disclaimer, the term of this patent is extended or adjusted under 35 U.S.C. 154(b) by 1112 days.

(21) Appl. No.: 14/984,216

(22) Filed: Dec. 30, 2015

(65) Prior Publication Data

US 2017/0193389 A1    Jul. 6, 2017

(51) Int. Cl.
  *G06N 20/00*   (2019.01)
  *G06F 16/901*  (2019.01)
  *G06N 5/04*    (2006.01)

(52) U.S. Cl.
  CPC ......... *G06N 20/00* (2019.01); *G06F 16/9024* (2019.01); *G06N 5/046* (2013.01)

(58) Field of Classification Search
  CPC .............................. G06F 16/9027; G06N 5/046
  See application file for complete search history.

(56) References Cited

U.S. PATENT DOCUMENTS

| | | | | |
|---|---|---|---|---|
| 7,854,007 | B2 * | 12/2010 | Sprosts | G06Q 10/107 726/24 |
| 8,572,007 | B1 | 10/2013 | Manadhata et al. | |
| 2003/0212657 | A1 | 11/2003 | Kaluskar et al. | |
| 2004/0030707 | A1 | 2/2004 | Lu et al. | |

(Continued)

FOREIGN PATENT DOCUMENTS

| | | |
|---|---|---|
| CN | 108604239 A | 9/2018 |
| EP | 3 398 084 A1 | 11/2018 |

(Continued)

OTHER PUBLICATIONS

Ruano-Ordas, D. A., "Model For Optimising the Execution of Anti-Spam Systems", PhD thesis, University of Vigo, Spain, Apr. 2015 (Year: 2015).*

(Continued)

*Primary Examiner* — Robert A Cassity
*Assistant Examiner* — Nader Metwalli
(74) *Attorney, Agent, or Firm* — FisherBroyles, LLP

(57) ABSTRACT

The disclosed computer-implemented method for efficiently classifying data objects may include (1) receiving a data object to be classified according to a group of rules, where each rule includes one or more clauses, (2) creating, for each rule, a rule evaluation job that directs a rule evaluation processor to evaluate the data object according to the clauses within the rule, where the rule evaluation processor evaluates the clauses in increasing order of estimated processing time, (3) submitting the rule evaluation jobs created for the rules to rule evaluation queues for processing by the rule evaluation processor, where the rule evaluation jobs are submitted in decreasing order of estimated processing time, (4) receiving an evaluation result for each rule evaluation job, and (5) in response to receiving the evaluation results, classifying the data object according to the evaluation results. Various other methods, systems, and computer-readable media are also disclosed.

20 Claims, 6 Drawing Sheets

(56) References Cited

U.S. PATENT DOCUMENTS

2010/0274750 A1   10/2010   Oltean et al.
2015/0163328 A1*   6/2015   Natarajan ............... H04L 69/22
                                                                                        370/392

FOREIGN PATENT DOCUMENTS

| JP | 2005-525657 A | 8/2005 |
| JP | 2008-310634 A | 12/2008 |
| JP | 2012-524941 A | 10/2012 |
| JP | 2014-071495 A | 4/2014 |
| JP | 2019-502998 A | 1/2019 |
| WO | 2017/116594 A1 | 7/2017 |

OTHER PUBLICATIONS

"File Server Resource Manager", https://technet.microsoft.com/en-us/library/cc732431(v=ws.11).aspx, as accessed Dec. 7, 2015, Windows Server 2008 R2, Microsoft, (on or before Dec. 7, 2015).
"FSRM and FCI: Frequently Asked Questions", https://technet.microsoft.com/en-us/library/ee344836(v=ws.10).aspx, as accessed Dec. 7, 2015, Microsoft, (Feb. 27, 2011).
International Search Report and Written Opinion received for PCT Application Serial No. PCT/US2016/064041 dated Feb. 6, 2017, 9 pages.
Ni et al., "Object and rule based approach for classification of high spatial resolution data over urban areas", Remote Sensing of the Environment: The 17th China Conference On Remote Sensing, Proceedings of SPIE, vol. 8203, No. 1, Sep. 14, 2010, 8 pages.
International Preliminary Report on Patentability received for PCT Application Serial No. PCT/US2016/064041 dated Jul. 12, 2018, 7 pages.

* cited by examiner

US 10,706,368 B2

SYSTEMS AND METHODS FOR EFFICIENTLY CLASSIFYING DATA OBJECTS

BACKGROUND

Data management systems, such as archival systems and data loss protection (DLP) systems, often handle different categories of data in different ways. For example, different data retention or data security policies may apply to internal email messages versus email messages sent to clients, or marketing data files versus financial or engineering data files. As such, data management systems often assign each data object to a category before determining how to handle individual data objects.

Unfortunately, the number of data objects processed by data management systems may be very large, often with periods of peak workload. Consequently, the process of classifying data objects often proves to be a bottleneck in data management systems. Accordingly, the instant disclosure identifies and addresses a need for additional and improved systems and methods for efficiently classifying data objects.

SUMMARY

As will be described in greater detail below, the instant disclosure describes various systems and methods for efficiently classifying data objects according to a set of classification rules. The systems and methods described herein may create rule evaluation jobs for classifying data objects, and then queue the rule evaluation jobs according to an estimated processing time for the rule evaluation job, thereby reducing the time required to classify data objects according to the set of classification rules. The systems and methods described herein may also estimate the processing time required to process classification rules based on historical data and may employ other techniques for improving the efficiency of categorizing data objects, such as taking advantage of multi-core processors, restricting rule processing to just a portion of a data object, and/or analyzing rule logic to identify the order of operations most likely to minimize rule processing time.

In one example, a computer-implemented method for efficiently classifying data objects may include (1) receiving a data object to be classified according to a group of rules for classifying data objects, where each classification rule includes one or more clauses, (2) creating, for each classification rule in the classification rules, a rule evaluation job that directs a rule evaluation processor to evaluate the data object according to the clauses within the classification rule, where the rule evaluation processor evaluates the clauses within the classification rule in increasing order of estimated processing time, (3) submitting the rule evaluation jobs created for the classification rules to one or more rule evaluation queues for processing by the rule evaluation processor, where the rule evaluation jobs are submitted in decreasing order of estimated processing time, (4) receiving, from the rule evaluation processor, an evaluation result for each rule evaluation job, and (5) in response to receiving the evaluation results for the rule evaluation jobs, classifying the data object according to the evaluation results.

In one embodiment, the computer-implemented method may further include a group of independently executing rule evaluation processors, where each rule evaluation processor processes rule evaluation jobs from one or more rule evaluation queues. In one embodiment, the independently executing rule evaluation processors may include cores of a multi-core processor. In one example, the rule evaluation job may direct the rule evaluation processor to evaluate the data object according to a classification rule that includes a set of logically conjoined clauses, where each clause evaluates one or more attributes of the data object, and the rule evaluation job directs the rule evaluation processor to terminate evaluation of the classification rule when evaluation of one or more of the logically conjoined clauses produces a negative result.

In one embodiment, one or more clauses of the classification rule may specify a portion of the data object to be evaluated by the rule evaluation processor. In addition, the computer-implemented method may further include measuring a time taken by the rule evaluation processor to evaluate one or more clauses of one or more classification rules and estimating processing time for the clause based on the measured time. In one embodiment, the computer-implemented method may further include measuring a time taken by the rule evaluation processor to evaluate one or more classification rules and estimating processing time for the classification rule based on the measured time.

In one embodiment, a system for implementing the above-described method may include several modules stored in memory, such as (1) a communication module that receives a data object to be classified according to a group of rules for classifying data objects, where each classification rule may include one or more clauses, (2) a task module that creates, for each classification rule in the classification rules, a rule evaluation job that directs a rule evaluation processor to evaluate the data object according to the clauses within the classification rule, where the rule evaluation processor evaluates the clauses within the classification rule in increasing order of estimated processing time, (3) a queuing module that submits the rule evaluation jobs created for the classification rules to one or more rule evaluation queues for processing by the rule evaluation processor, where the rule evaluation jobs are submitted in decreasing order of estimated processing time, (4) a results module that receives, from the rule evaluation processor, an evaluation result for each rule evaluation job, and/or (5) a classification module that, in response to receiving the evaluation results for the rule evaluation jobs, classifies the data object according to the evaluation results. The system may also include at least one physical processor configured to execute the communication module, the task module, the queuing module, the results module, and the classification module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive a data object to be classified according to a group of rules for classifying data objects, where each classification rule includes one or more clauses, (2) create, for each classification rule in the classification rules, a rule evaluation job that directs a rule evaluation processor to evaluate the data object according to the clauses within the classification rule, where the rule evaluation processor evaluates the clauses within the classification rule in increasing order of estimated processing time, (3) submit the rule evaluation jobs created for the classification rules to one or more rule evaluation queues for processing by the rule evaluation processor, where the rule evaluation jobs are submitted in decreasing order of estimated processing time, (4) receive, from the rule evaluation processor, an evaluation result for each rule evaluation job, and (5) in response to receiving the evaluation results for the rule evaluation jobs, classify the data object according to the evaluation results.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
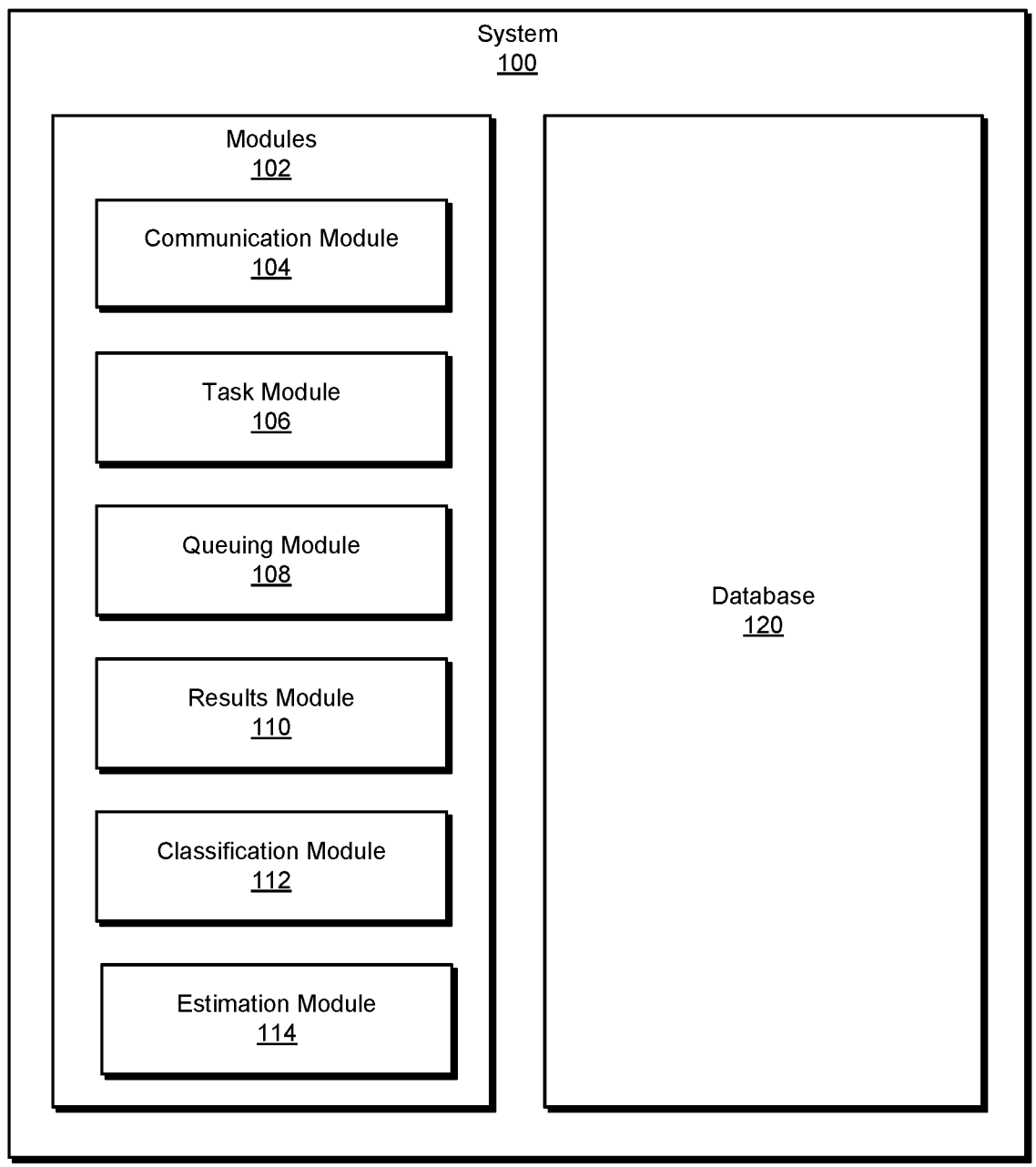
FIG. 1 is a block diagram of an exemplary system for efficiently classifying data objects.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for efficiently classifying data objects. As will be explained in greater detail below, the systems and methods described herein may efficiently classify data objects by applying a number of processing optimization techniques when classifying data objects according to a set of classification rules. Some of the processing optimization techniques may include taking advantage of multiple processing units on multi-core processors to evaluate classification rules in parallel and queuing evaluation of classification rules and the clauses within classification rules based on historical processing time data to increase the likelihood that the classification of each data object may be determined using minimal processing time.

Figure 2:
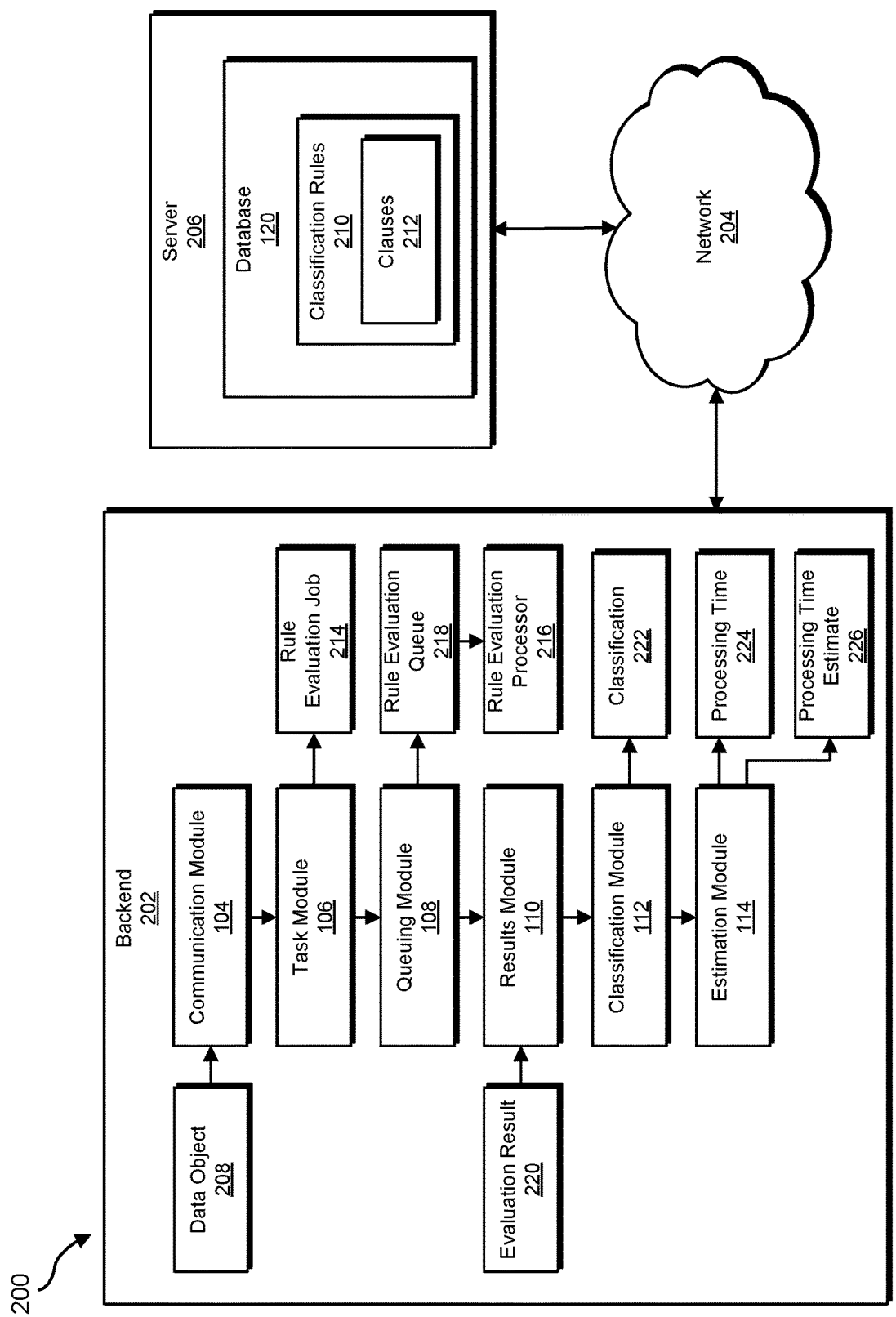
FIG. 2 is a block diagram of an additional exemplary system for efficiently classifying data objects.
Figure 3:
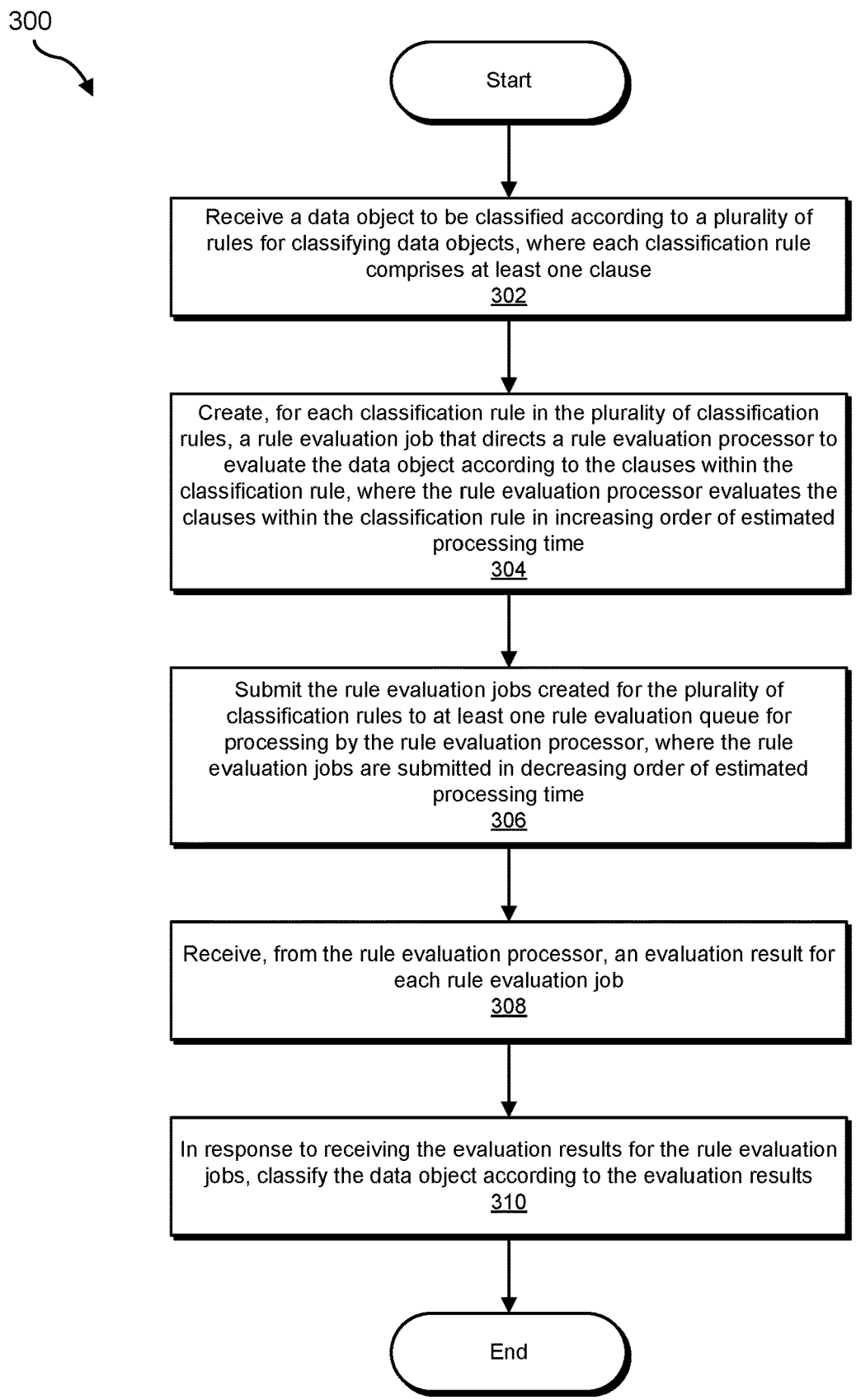
FIG. 3 is a flow diagram of an exemplary method for efficiently classifying data objects.
Figure 4:
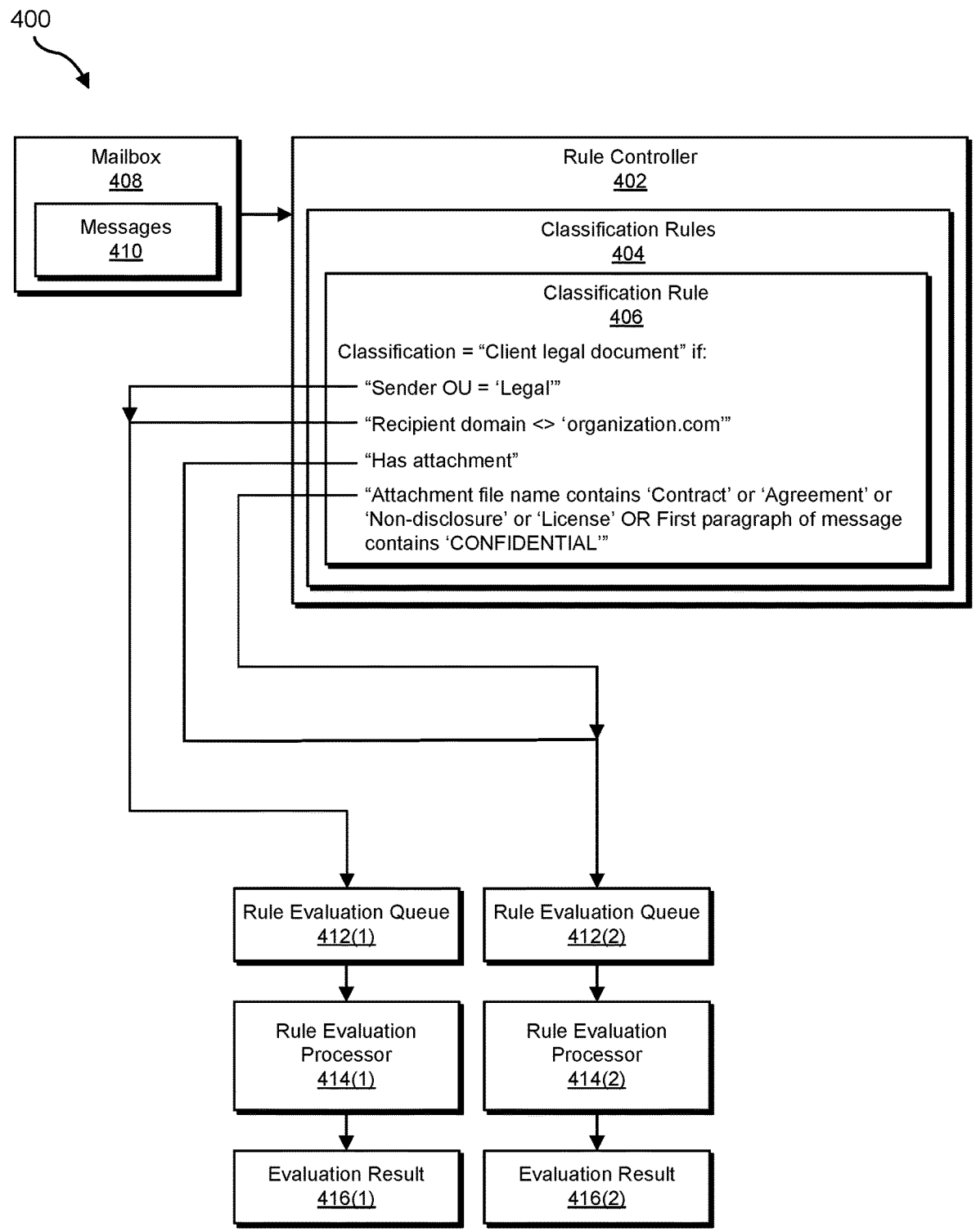
FIG. 4 is a block diagram of an additional exemplary system for efficiently classifying data objects.

The following will provide, with reference to FIGS. 1, 2, and 4 detailed descriptions of exemplary systems for efficiently classifying data objects. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for efficiently classifying data objects. As illustrated in this figure, exemplary system 100 may include one or more modules 102 for performing one or more tasks. For example, and as will be explained in greater detail below, exemplary system 100 may include a communication module 104 that receives a data object to be classified according to a plurality of rules for classifying data objects, where each classification rule may include at least one clause. Exemplary system 100 may additionally include a task module 106 that creates, for each classification rule in the plurality of classification rules, a rule evaluation job that directs a rule evaluation processor to evaluate the data object according to the clauses within the classification rule, where the rule evaluation processor evaluates the clauses within the classification rule in increasing order of estimated processing time. Exemplary system 100 may also include a queuing module 108 that submits the rule evaluation jobs created for the plurality of classification rules to one or more rule evaluation queues for processing by the rule evaluation processor, where the rule evaluation jobs are submitted in decreasing order of estimated processing time. Exemplary system 100 may additionally include a results module 110 that receives, from the rule evaluation processor, an evaluation result for each rule evaluation job. Exemplary system 100 may also include a classification module 112 that, in response to receiving the evaluation results for the rule evaluation jobs, classifies the data object according to the evaluation results. Exemplary system 100 may also include an estimation module 114 that measures time taken by the rule evaluation processor to evaluate processing of classification rules, as well as time taken by the rule evaluation processor to evaluate classification rule clauses. Estimation module 114 may also estimate processing time for the rules and/or clauses based on the measured time. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., backend 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store data objects, rules for classifying data objects, and/or actions to be performed for various data object classifications. Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a backend 202 in communication with a server 206 via a network 204. In one example, backend 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of backend 202 and/or server 206, enable backend 202 and/or server 206 to efficiently classify data objects. For example, and as will be described in greater detail below, communication module 104 may receive a data object 208 to be classified according to a plurality of rules 210 for classifying data objects, where each classification rule may include one or more clauses 212. Task module 106 may create, for each classification rule in the plurality of classification rules 210, a rule evaluation job 214 that directs a rule evaluation processor 216 to evaluate data object 208 according to the clauses within the classification rule, where rule evaluation processor 216 evaluates the clauses 212 within the classification rule 210 in increasing order of estimated processing time. Queuing module 108 may then submit the rule evaluation jobs 214 created for the plurality of classification rules 210 to at least one rule evaluation queue 218 for processing by rule evaluation processor 216, where the rule evaluation jobs are submitted in decreasing order of estimated processing time. Results module 110 may then receive, from rule evaluation processor 216, an evaluation result 220 for each rule evaluation job 214. Finally, classification module 112 may, in response to receiving the evaluation result 220 for the rule evaluation jobs 214, classify data object 208 according to the evaluation result 220.

Backend 202 generally represents any type or form of computing device capable of reading computer-executable instructions. Examples of backend 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device that is capable of receiving, comparing, and/or storing data. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between backend 202 and server 206.

FIG. 3 is a flow diagram of an exemplary computer-implemented method 300 for efficiently classifying data objects. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may receive a data object to be classified according to a plurality of rules for classifying data objects, where each classification rule may include one or more clauses. For example, communication module 104 may, as part of backend 202 in FIG. 2, receive a data object 208 to be classified according to a plurality of classification rules 210 for classifying data objects, where each classification rule 210 may include one or more clauses 212.

The term "data object," as used herein, generally refers to a quantity of data that a data management system may store and manage as a single object. Each data object may be classified according to a set of classification rules, with the data management system taking an action based on the classification. Data objects may include, without limitation, files, messages, data structures, database records, or web pages.

The term "classification rule," as used herein, generally refers to a set of one or more clauses that may be combined to classify a data object. Each clause may define an attribute of the data object that determines whether the data object belongs to the category. A classification rule may combine clauses using parentheses and/or Boolean operators such as "AND," "OR," and "NOT." For example, a classification rule may classify a file as "CAD Drawing" if "Owner OU='Engineering' AND (File extension='DXF' OR File Extension='GDL')."

Communication module 104 may receive a data object in a variety of ways. For example, communication module 104 may receive the data object by retrieving a record from a database or extracting a message from an email mailbox. In other examples, communication module 104 may receive the data object by retrieving a file from a storage device, receiving the data object via a connection with a data management system, or by any other suitable means.

In one example, classification of the data object may proceed independently from the data management system. This may be significant in embodiments where classification of the data object is executed on the same device as a data management system. Regardless of whether data object classification executes on the same device as the data management system or on separate devices, communication module 104 may notify the data management system that classification of the data object will continue asynchronously and that the data management system will receive the classification for the data object when it has been determined at a later time.

At step 304, one or more of the systems described herein may create, for each classification rule in the plurality of classification rules, a rule evaluation job that directs a rule evaluation processor to evaluate the data object according to the clauses within the classification rule, where the rule evaluation processor evaluates the clauses within the classification rule in increasing order of estimated processing time. For example, task module 106 may, as part of backend 202 in FIG. 2, create, for each classification rule in the plurality of classification rules 210, a rule evaluation job 214 that directs rule evaluation processor 216 to evaluate data object 208 according to the clauses 212 within the classification rule 210, where rule evaluation processor 216 evaluates the clauses 212 within the classification rule 210 in increasing order of estimated processing time.

Task module 106 may create rule evaluation jobs for each classification rule in a variety of ways. For example, task module 106 may receive a set of classification rules from a data management system in the form of a text file containing the classification rules in a natural or scripting language. In another example, task module 106 may receive a set of classification rules in the form of statements written in a database query language (such as SQL) that may be used for selecting data objects from a database.

After receiving the set of classification rules, task module 106 may analyze the classification rules to identify the clauses comprised within each classification rule and estimate the processing time for each clause. As will be described in greater detail below, task module 106 may use historical data to estimate the processing time for each clause. Task module 106 may then create a rule evaluation job for each classification rule that directs the rule evaluation processor to evaluate a data object according to the clauses within each classification rule in increasing order of processing time. In one example, evaluating a data object may involve determining whether attributes of a provided data object match criteria specified by a classification rule. In another example, evaluating a data object may involve selecting the data object from a database using a database query.

In one embodiment, one or more clauses of the classification rule may specify a portion of the data object to be evaluated by the rule evaluation processor. For example, a classification rule for email messages may search for messages where the subject line of the email or the first paragraph of the message body contains a particular word or series of words. In other examples, a classification rule for files may search for messages created after a specific date and time, or messages with a ".TXT" file name extension.

In one embodiment, the rule evaluation job directs the rule evaluation processor to evaluate the data object according to a classification rule comprising a set of logically conjoined clauses, where each clause evaluates one or more attributes of the data object and the rule evaluation job directs the rule evaluation processor to terminate evaluation of the classification rule when evaluation of one or more of the logically conjoined clauses produces a negative result. Evaluating the clauses of a classification rule in increasing order of processing time may reduce the time required to evaluate the classification rule. For example, a classification rule for email messages may search for messages matching "Subject does not contain 'Out of office' AND Message contains 'CONFIDENTIAL'." In this example, the clause that evaluates the message subject may require less time to execute than the clause that evaluates the message body. Because the two clauses are joined by "AND," if the rule evaluation processor determines that the message subject contains "Out of office," the rule evaluation processor may then determine that the message does not match the classification rule without evaluating the second clause in the rule.

At step 306, one or more of the systems described herein may submit the rule evaluation jobs created for the plurality of classification rules to one or more rule evaluation queues for processing by the rule evaluation processor, where the rule evaluation jobs are submitted in decreasing order of estimated processing time. For example, queuing module 108 may, as part of backend 202 in FIG. 2, submit the rule evaluation jobs 214 created for the plurality of classification rules 210 to one or more rule evaluation queues 218 for processing by rule evaluation processor 216, where the rule evaluation jobs 214 are submitted in decreasing order of estimated processing time. By queuing rule evaluation jobs that require the most processing time first, queuing module 108 may reduce the overall time required for processing all of the rule evaluation jobs for a set of classification rules since rule evaluation jobs that require less processing time may be queued for processing by other rule evaluation processors in parallel to the jobs requiring the most processing time.

Queuing module 108 may submit the rule evaluation jobs to the rule evaluation queues in a variety of ways. For example, with rule evaluation processors that evaluate each clause of a classification rule separately, queuing module 108 may submit each clause of a classification rule to a rule evaluation queue as separate rule evaluation jobs in the order they are to be processed. In another example, with rule evaluation processors that can separate the clauses of a classification rule, queuing module 108 may submit a classification rule to a rule evaluation queue with an indication of the order in which the clauses of the classification rule are to be evaluated.

In one embodiment, the systems described herein may include several independently executing rule evaluation processors, with each rule evaluation processor processing rule evaluation jobs from one or more rule evaluation queues. In one embodiment, the independently executing rule evaluation processors may represent cores of a multi-core processor. For example, queuing module 108 may, as part of backend 202 in FIG. 2, queue rule evaluation jobs 214 in several rule evaluation queues 218 managed by backend 202. Jobs from each rule evaluation queue 218 may be evaluated in parallel by separate processing units of a multi-core processor acting as rule evaluation processors 216.

In one embodiment, the systems described herein may measure a time taken by the rule evaluation processor to evaluate one or more clauses of one or more classification rules and estimate processing time for the clause based on the measured time. The systems described herein may also measure a time taken by the rule evaluation processor to evaluate one or more classification rules and estimate processing time for the classification rule based on the measured time. For example, estimation module 114 may, as part of backend 202 in FIG. 2, measure a processing time 224 taken by rule evaluation processor 216 to evaluate clauses 212 of classification rules 210 and produce processing time estimate 226 based on the measured processing time 224. Estimation module 114 may also measure a processing time 224 taken by rule evaluation processor 216 to evaluate a classification rule 210 as a whole and produce processing time estimate 226 for the classification rule 210 based on the measured processing time 224.

Estimation module 114 may estimate processing time for classification rules or for clauses of classification rules in any suitable manner. For example, estimation module may maintain an estimated processing time for each clause in a set of classification rules and for each classification rule as a whole. The estimated processing time may, for example, represent an average or median value of some or all processing times for each rule or clause or a moving average of the most recent processing times.

At step 308, one or more of the systems described herein may receive, from the rule evaluation processor, an evaluation result for each rule evaluation job. For example, results module 110 may, as part of backend 202 in FIG. 2, receive, from rule evaluation processor 216, evaluation result 220 for each rule evaluation job 214.

The term "evaluation result," as used herein, generally refers to a determination of whether a data object meets the criteria for a data classification as specified by a classification rule. Results module 110 may receive evaluation results for each rule evaluation job in a variety of ways. For example, as described above, a rule evaluation job may evaluate one clause from a classification rule. Results module 110 may receive the evaluation results from each of a classification rule's clauses. In another example, a rule evaluation processor may evaluate an entire classification rule in one rule evaluation job. Results module 110 may then receive an evaluation result from the evaluation processor that indicates whether the data object belongs to the classification associated with the classification rule.

At step 310, one or more of the systems described herein may, in response to receiving the evaluation results for the rule evaluation jobs, classify the data object according to the evaluation results. For example, classification module 112 may, as part of backend 202 in FIG. 2, and in response to receiving the evaluation results 220 for the rule evaluation jobs 214, classify data object 208 according to the evaluation results 220.

Classification module 112 may classify the data object in a variety of ways. For example, if results module 110 receives the results of several rule evaluation jobs that evaluate each of a classification rule's clauses separately, classification module 112 may combine each of the evaluation results according to the logic of the classification rule to determine whether the data object meets the classification rule's criteria. In another example, classification module 112 may receive evaluation results from results module 110 that indicate the results of evaluating an entire classification rule. Classification module 112 may determine whether the data object meets the criteria outlined in the classification rule without performing any further evaluation.

After receiving evaluation results from several rule evaluation jobs, classification module 112 may determine whether the data object meets the criteria outlined in each of a set of classification rules. For example, if a classification rule specifies that an email message may be classified as "Legal" if "Sender OU='Legal' AND Subject does not contain 'Personal'," and classification module 112 determines that an email message meets those criteria, classification module 112 may classify the email message as "Legal." In some examples, once classification module 112 has assigned a classification to a data object, classification module 112 may terminate the execution of rule evaluation jobs that evaluate the data object's conformity to other classification rules.

After determining a data object's classification, classification module 112 may identify the data object to a data management system, along with the assigned classification. In some examples, classification module 112 may notify the data management system that a data object classification is available and provide identification of the data object and its assigned classification when requested by the data management system. In other examples, classification module 112 may set an attribute of the data object to the assigned classification. For example, classification module 112 may set a metadata tag of a file or email message, or a field in a database record to a value indicating the data object's assigned classification.

FIG. 4 is a block diagram of a rule processing system 400 for efficiently classifying data objects. As shown in FIG. 4, rule processing system 400 may include a rule controller 402 that evaluates email messages 410 in mailbox 408 according to a set of classification rules 404. The set of classification rules 404 may include classification rule 406. In one embodiment, rule controller 402 may include backend 202 of system 200 in FIG. 2, along with modules 102 of system 100 in FIG. 1.

As shown in FIG. 4, rule controller 402 may evaluate an email message 410 according to each of the clauses of classification rule 406, which classifies an email message as "Client legal document" if "Sender OU='Legal' AND Recipient domain < > 'organization.com' AND Has attachment AND "Attachment file name contains 'Contract' or 'Agreement' or 'Non-disclosure' or 'License' OR First paragraph of message contains 'CONFIDENTIAL'." Based on historical data, rule controller 402 may determine that evaluating the Sender OU and Recipient domain requires less processing time than evaluating the Attachment file name. Rule controller 402 may queue evaluation of the Sender OU and Recipient domain to rule evaluation queue 412(1) and evaluation of the Attachment file name to rule evaluation queue 412(2). Rule controller 402 may also determine that evaluation of the Attachment file name is unnecessary if the message does not have an attachment, and therefore evaluation of the "Has attachment" clause should be queued before evaluation of the attachment file name. After receiving evaluation results 416(1) and 416(2) for each of the clauses of classification rule 406 from rule evaluation processor 414(1) and 414(2), rule controller 402 may determine whether a message may be classified as a "Client legal document" according to classification rule 406.

As described in greater detail above, the systems and methods described herein may take advantage of several available processors to execute rule evaluation jobs in parallel to evaluate each data object according to a set of classification rules. Additionally, the systems and methods described herein may use historical processing time data to estimate the processing time required to evaluate each classification rule and the clauses within each classification rule. The systems and methods described herein may use the estimated processing time to queue evaluation of classification rules and the clauses within the classification rules to minimize the amount of time to arrive at a classification for each data object. The systems and methods described herein may also use the logic of classification rules to enable further execution of rule evaluation jobs to be terminated when the proper classification for the data object has been determined.

Figure 5:
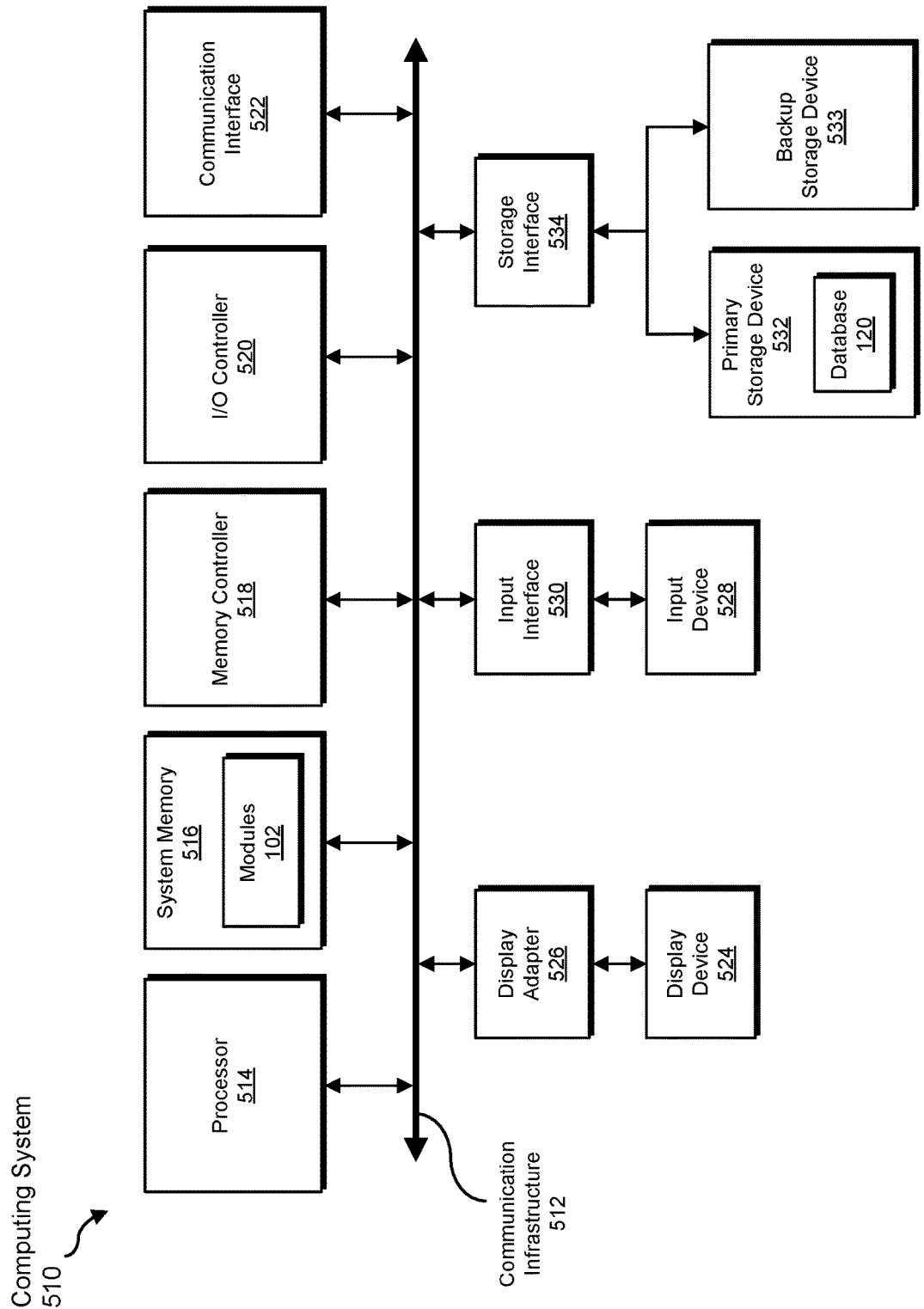
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
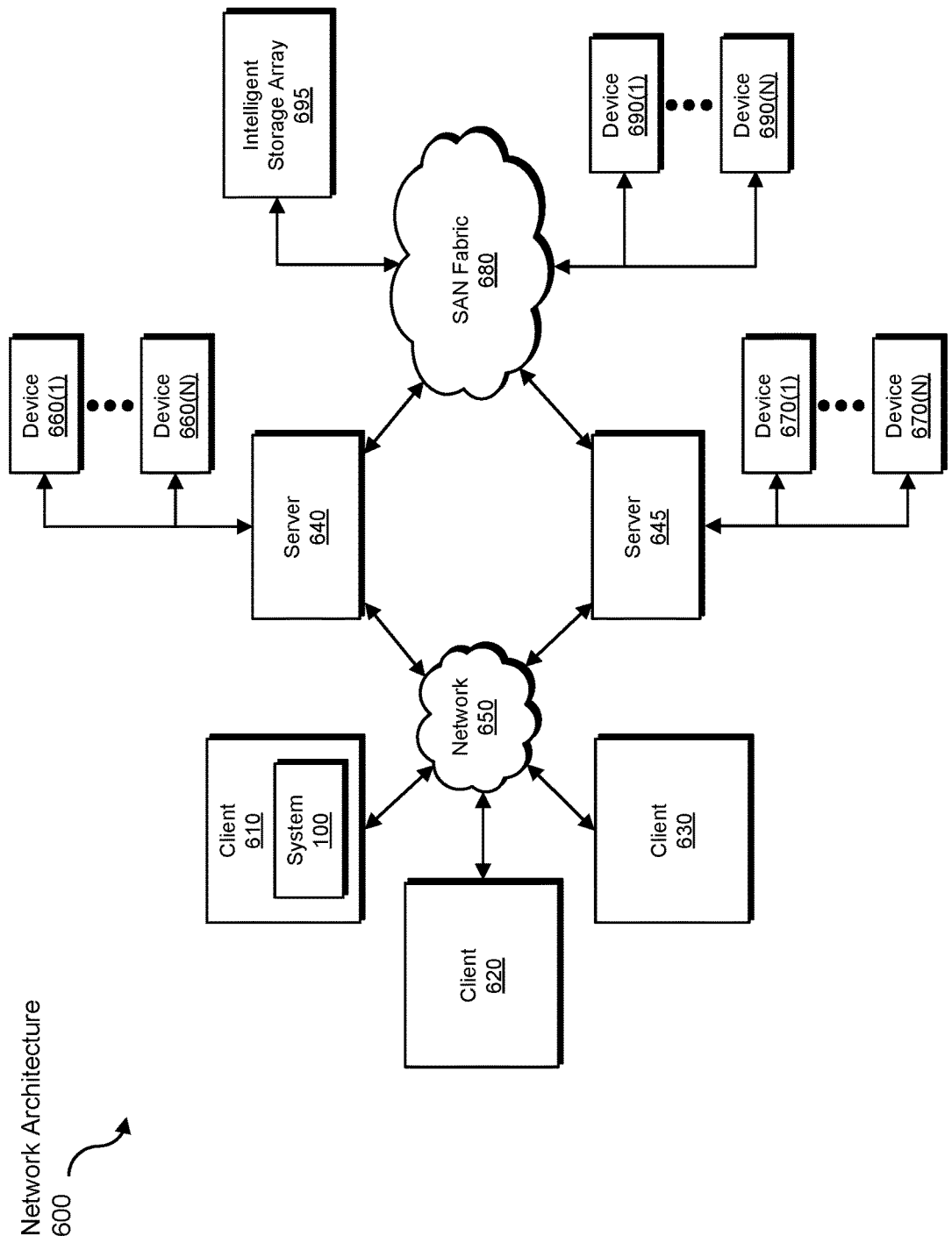
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for efficiently classifying data objects.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data objects and classification rules to be transformed, transform the data objects and classification rules, output a result of the transformation to classify the data objects according to the classification rules, use the result of the transformation to determine how the data objects are to be processed, and store the result of the transformation to record how the data object has been classified. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for efficiently classifying data objects, at least a portion of the method being performed by a computing device comprising at least one processor, the method comprising:
   receiving a data object to be classified according to a plurality of classification rules for classifying data objects, wherein each classification rule comprises at least one clause;
   creating, for each classification rule in the plurality of classification rules, a rule evaluation job that directs a rule evaluation processor of a plurality of independently executing rule evaluation processors to evaluate the data object according to the clauses within the classification rule, wherein the rule evaluation processor that processes the rule evaluation job evaluates the clauses within the classification rule in increasing order of estimated processing time for reducing an amount of time to complete an evaluation of the data object using the classification rule;
   submitting the rule evaluation jobs created for the plurality of classification rules to one or more rule evaluation queues for processing by the plurality of independently executing rule evaluation processors in parallel, wherein the rule evaluation jobs are submitted to the one or more rule evaluation queues in decreasing order of estimated processing time for reducing an overall amount of time for the plurality of independently executing rule evaluation processors to complete the rule evaluation jobs;
   receiving, from the plurality of independently executing rule evaluation processors, an evaluation result for each rule evaluation job; and
   in response to receiving the evaluation results for the rule evaluation jobs, classifying the data object according to the evaluation results.

2. The computer-implemented method of claim 1, wherein each rule evaluation processor of the plurality of independently executing rule evaluation processors processes rule evaluation jobs from at least one of the one or more rule evaluation queues.

3. The computer-implemented method of claim 1, wherein the plurality of independently executing rule evaluation processors comprise cores of a multi-core processor.

4. The computer-implemented method of claim 1, wherein the rule evaluation job:
   directs the rule evaluation processor to evaluate the data object according to a classification rule comprising a set of logically conjoined clauses, wherein each clause evaluates at least one attribute of the data object; and
   directs the rule evaluation processor to terminate evaluation of the classification rule when evaluation of at least one of the logically conjoined clauses produces a negative result.

5. The computer-implemented method of claim 1, wherein at least one clause of the classification rule specifies a portion of the data object to be evaluated by the rule evaluation processor.

6. The computer-implemented method of claim 1, further comprising:
   measuring a time taken by at least one rule evaluation processor of the plurality of independently executing rule evaluation processors to evaluate at least one clause of at least one classification rule; and
   estimating processing time for the at least one clause based on the measured time.

7. The computer-implemented method of claim 1, further comprising:
   measuring a time taken by at least one rule evaluation processor of the plurality of independently executing rule evaluation processors to evaluate at least one classification rule; and
   estimating processing time for the at least one classification rule based on the measured time.

8. A system for efficiently classifying data objects, the system comprising:
   a communication module, stored in memory, that receives a data object to be classified according to a plurality of classification rules for classifying data objects, wherein each classification rule comprises at least one clause;
   a task module, stored in memory, that creates, for each classification rule in the plurality of classification rules, a rule evaluation job that directs a rule evaluation processor of a plurality of independently executing rule evaluation processors to evaluate the data object according to the clauses within the classification rule, wherein the rule evaluation processor that processes the rule evaluation job evaluates the clauses within the classification rule in increasing order of estimated processing time for reducing an amount of time to complete an evaluation of the data object using the classification rule;
   a queuing module, stored in memory, that submits the rule evaluation jobs created for the plurality of classification rules to one or more rule evaluation queues for processing by the plurality of independently executing rule evaluation processors in parallel, wherein the rule evaluation jobs are submitted to the one or more rule evaluation queues in decreasing order of estimated processing time for reducing an overall amount of time for the plurality of independently executing rule evaluation processors to complete the rule evaluation jobs;

a results module, stored in memory, that receives, from the plurality of independently executing rule evaluation processors, an evaluation result for each rule evaluation job;

a classification module, stored in memory, that, in response to receiving the evaluation results for the rule evaluation jobs, classifies the data object according to the evaluation results; and at least one physical processor configured to execute the communication module, the task module, the queuing module, the results module, and the classification module.

9. The system of claim 8, wherein each rule evaluation processor of the plurality of independently executing rule evaluation processors processes rule evaluation jobs from at least one of the one or more rule evaluation queues.

10. The system of claim 8, wherein the plurality of independently executing rule evaluation processors comprise cores of a multi-core processor.

11. The system of claim 8, wherein the rule evaluation job created by the task module:

directs the rule evaluation processor to evaluate the data object according to a classification rule comprising a set of logically conjoined clauses, wherein each clause evaluates at least one attribute of the data object; and directs the rule evaluation processor to terminate evaluation of the classification rule when evaluation of at least one of the logically conjoined clauses produces a negative result.

12. The system of claim 8, wherein at least one clause of the classification rule specifies a portion of the data object to be evaluated by the rule evaluation processor.

13. The system of claim 8, further comprising an estimation module that:

measures a time taken by at least one rule evaluation processor of the plurality of independently executing rule evaluation processors to evaluate at least one clause of at least one classification rule; and estimates processing time for the at least one clause based on the measured time.

14. The system of claim 13, wherein the estimation module:

measures a time taken by at least one rule evaluation processor of the plurality of independently executing rule evaluation processors to evaluate at least one classification rule; and estimates processing time for the at least one classification rule based on the measured time.

15. A non-transitory computer-readable medium comprising one or more computer-readable instructions that, when executed by at least one processor of a computing device, cause the computing device to:

receive a data object to be classified according to a plurality of classification rules for classifying data objects, wherein each classification rule comprises at least one clause;

create, for each classification rule in the plurality of classification rules, a rule evaluation job that directs a rule evaluation processor of a plurality of independently executing rule evaluation processors to evaluate the data object according to the clauses within the classification rule, wherein the rule evaluation processor that processes the rule evaluation job evaluates the clauses within the classification rule in increasing order of estimated processing time for reducing an amount of time to complete an evaluation of the data object using the classification rule;

submit the rule evaluation jobs created for the plurality of classification rules to one or more rule evaluation queues for processing by the plurality of independently executing rule evaluation processors in parallel, wherein the rule evaluation jobs are submitted to the one or more rule evaluation queues in decreasing order of estimated processing time for reducing an overall amount of time to complete the rule evaluation jobs;

receive, from the plurality of independently executing rule evaluation processors, an evaluation result for each rule evaluation job; and in response to receiving the evaluation results for the rule evaluation jobs, classify the data object according to the evaluation results.

16. The non-transitory computer-readable medium of claim 15, wherein each rule evaluation processor of the plurality of independently executing rule evaluation processors processes rule evaluation jobs from at least one of the one or more rule evaluation queues.

17. The non-transitory computer-readable medium of claim 15, wherein the plurality of independently executing rule evaluation processors comprise cores of a multi-core processor.

18. The non-transitory computer-readable medium of claim 15, wherein the one or more computer-readable instructions cause the computing device to create the rule evaluation job that:

directs the rule evaluation processor to evaluate the data object according to a classification rule comprising a set of logically conjoined clauses, wherein each clause evaluates at least one attribute of the data object; and directs the rule evaluation processor to terminate evaluation of the classification rule when evaluation of at least one of the logically conjoined clauses produces a negative result.

19. The non-transitory computer-readable medium of claim 15, wherein at least one clause of the classification rule specifies a portion of the data object to be evaluated by the rule evaluation processor.

20. The non-transitory computer-readable medium of claim 15, wherein the one or more computer-readable instructions cause the computing device to:

measure a time taken by at least one rule evaluation processor of the plurality of independently executing rule evaluation processors to evaluate at least one clause of at least one classification rule; and estimate processing time for the at least one clause based on the measured time.

\* \* \* \* \*